United States Patent [19]
Carey, Jr.

[11] 4,102,721
[45] Jul. 25, 1978

[54] BARRIER TAPE CONSTRUCTION

[75] Inventor: Patrick H. Carey, Jr., Bloomington, Minn.

[73] Assignee: Minnesota Mining and Manufacturing Company, St. Paul, Minn.

[21] Appl. No.: 731,540

[22] Filed: Oct. 13, 1976

[51] Int. Cl.² ............................ C09J 7/02; B32B 7/10
[52] U.S. Cl. ..................................... 156/79; 249/113; 428/310; 428/317; 428/343
[58] Field of Search .................. 428/317, 343, 310; 249/112, 113; 156/79

[56] References Cited
U.S. PATENT DOCUMENTS

| | | | |
|---|---|---|---|
| 3,493,449 | 2/1970 | Krug | 156/79 |
| 3,844,523 | 10/1974 | Wilheim | 249/113 |
| 3,974,319 | 8/1976 | Alibeckoff | 428/300 |

*Primary Examiner*—William J. Van Balen
*Attorney, Agent, or Firm*—Cruzan Alexander; Donald M. Sell; Edward T. Okubo

[57] ABSTRACT

A pressure-sensitive barrier tape construction particularly suited as a covering for the vents or ports in a cavity to be filled with a thermally insulating foam, the barrier tape permitting the free escape of gases while preventing escape of the fluid foam therethrough.

5 Claims, 3 Drawing Figures

BARRIER TAPE CONSTRUCTION

BACKGROUND OF THE INVENTION

The present invention relates to a pressure-sensitive barrier tape construction particularly suited as a barrier for covering the vents or ports provided in a cavity to be filled with a thermally insulating or cushioning foam such as a urethane foam. The barrier tape comprises a thin, porous, nonwoven web unified by being coated with a pressure-sensitive adhesive resin which substantially coats the fibers thus bonding them together at their crossing points while leaving the interstices of the web unfilled.

The widespread use of rigid urethane foam for thermal insulation in such applications as household refrigerators and freezers, trailer bodies, railroad cars, construction and industrial insulation results perhaps as much from its low moisture permeability and low water absorption characteristics as well as from its insulating qualities.

The "one-shot" method of foaming through the use of modified toluene diisocyanate has greatly simplified the foam application process and the reaction mixture is generally of lower viscosity with improved mixability and flow. These characteristics are most desirable for the filling of complex shapes since the mixture can readily flow and fill the cavity as the foaming takes place.

In addition to its thermal insulating properties, urethane foam, in its flexible form, provides superior cushioning properties in such areas as chair cushions, automotive seats, and molded furniture.

In all of these uses, the air in the empty cavity must be displaced and the volume completely and uniformly filled with foam. The foaming process liberates dissolved gases such as carbon dioxide or fluorocarbons as well as other gaseous reaction products. These gases are forced through small vents or ports provided in the walls of the cavity as the foam expands.

It will be realized, of course, that in addition to the gases, fluid foam can also escape through these vents. This results in unnecessary waste of materials and creates the need to remove, by cutting, the exuded bumps of foam extending through the vents or ports. The open cut surface of the foam must then be sealed as by brushing on of a solvent to prevent the entrance of unwanted moisture into the foam.

Prior to this invention, a type of foam barrier was made by forming pads of ½ inch thick fiberglass insulation, applying a rubber cement to the surface surrounding the vent, and gluing the pads in place over the vents. These barriers, in addition to being hazardous to the health, were ofttimes ineffective and exuded foam still had to be cut from the wall surface and the cut then sealed to prevent moisture intrusion into the foam or if the resistance were too great, then adequate escape of the gases cannot occur and the cavity would not be uniformly filled with foam and the insulating value of the cabinet reduced.

The present invention provides a simple barrier means that is gas-permeable, urethane foam-impermeable and which is self-adhesively applied to the interior wall of a cavity to be filled with urethane foam, so as to cover the vents, thus allowing the cavity to be uniformly filled with foam while preventing the escape of foam therefrom.

SUMMARY OF THE INVENTION

The gas-permeable, foam-impermeable, barrier of the present invention comprises a thin, porous, nonwoven structure having a foam-contacting surface and a selfadhering wall-contacting surface.

The barrier structure is a mixture of hydrophobic staple length textile fibers and cellulosic paper-length fibers. The lofty blended fiber web is unified with a pressure-sensitive adhesive to form a pressure-sensitive adhesive skin layer on one side of the web to provide a porous, tacky surface and a foam-facing surface which is not tacky to the touch on the other side. The barrier structure can be slit to a width and wound into a continuous roll of material. In application, small lengths of the barrier are pressed over the venting ports of the cavity covering the opening.

Under compression, the resilient barrier structure will compact somewhat and the flow resistance at that time will increase, providing greater resistance to the passage of the still partially fluid, chemically reacting, urethane foam. The pressure of the foam upon the barrier structure is sufficient to deform the barrier, causing it to bulge slightly and yet not enough to protrude beyond the wall.

Since the barrier material remains a part of the foam, it is important to keep the mass of the barrier as low as feasible to prevent modification of the foam properties.

BRIEF DESCRIPTION OF THE DRAWINGS

In the accompanying drawing which illustrates the invention.

DETAILED DESCRIPTION OF THE INVENTION

Figure 1:
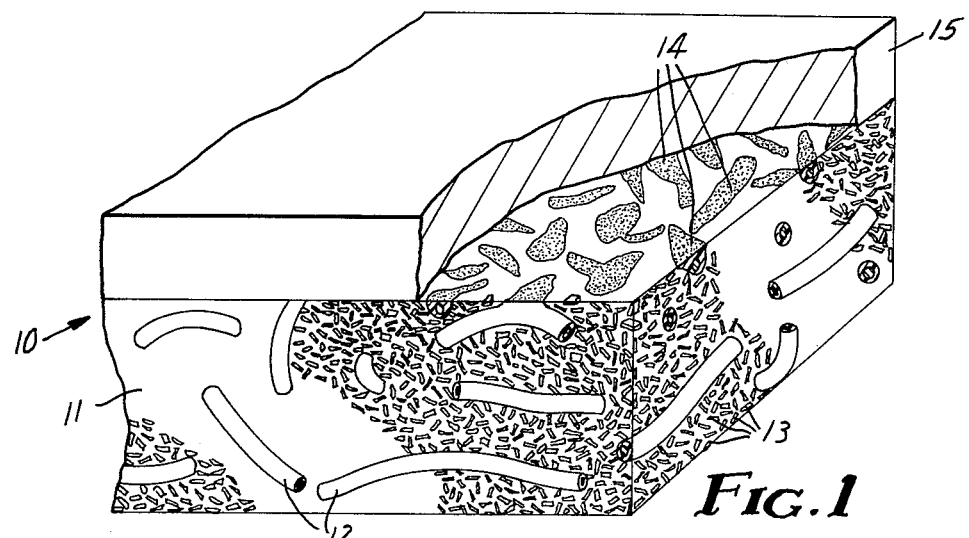
FIG. 1 is a greatly enlarged section of the barrier tape of the present invention.

Referring now more particularly to the drawings, the barrier tape 10 comprises a web 11 formed from a blend of staple length polyester fibers 12 and paper fibers 13 which are unified by being coated with a water-insoluble pressure-sensitive adhesive resin so that the fibers are substantially covered with the resin, thus bonding them together while leaving the interstices of the barrier tape unfilled.

The porous pressure-sensitive skin layer 14 bridges a portion of the openings between the fibers lying substantially in the plane formed by the surface of release paper 15. The fibers at the other surface of the barrier tape 10, while well coated with the pressure-sensitive adhesive resin, surprisingly do not exhibit noticeable tack.

The following Examples will serve to further illustrate the present invention.

EXAMPLE 1

A blend of 5 parts by weight of Ray Fluff X-Q, bleached hemlock sulfite paper fibers of average fiber length of 2.2 mm. available from Rayonier Inc., and 1 part by weight of 1.75 denier per filament, crimped, polyester fibers of 1.5 inch length made by the Celanese Corporation, is formed into a continuous fluffy layer on air forming equipment such as the Rando-Webber machine sold by the Curlator Corporation of Macedon, New York, to a uniform web whose weight is about 0.28 pound per square yard.

A dispersion of web unifying, skin forming pressure-sensitive resin is prepared by blending the following materials in a mixing vessel at room temperature:

Vinyl acetate/2 ethyl hexyl acrylate-Methyl Methacrylate (Film-Grip 68-13-D; Stein Hall Co.): 1200 ml
Ethyl Acrylate-acrylic acid copolymer (Acrysol ASE-60); (Rohm & Haas Co.): 37 gm
Sodium salt of condensed aryl sulfonic acid Tamol 731-25% (Rohm & Haas Co.): 15 gm
Octylphenoxy polyethoxy ethanol Triton X-100 (Rohm & Haas Co.): 5 gm
Ammonium hydroxide (28%): 20 gm
Pthalocynanine blue pigment dispersion W-4123 Harshaw Chemical Company: 2.5 gm
Hansa Yellow R pigment dispersion W1117 Harshaw Chemical Company: 0.5 gm
Water: 1800 ml The solids content of the solution was about 21.7 percent and the viscosity about 60 centipoises (#1 Brookfield spindle at 12 tpm). The fibrous batt is passed through a solution applying set of nip rolls at a speed of 50 inches per minute. The top solution applying roll is a 50-line grooved roll of 90° included angle and a 0.0065 inch depth. Excess solution is removed from the roll by a doctor blade.

A release liner, such as Weyerhaeuser Company's semi-bleached 43 pound "S/N 61" ClS silicone coated paper passes through the solution, around the bottom roll, through the nip, and through the drying oven. A tangential wiping blade, formed from 1 ½ mil polyester film, extends across the paper width and serves to level and unify the solution carried by the release paper.

The nip roll pressure exerted on the saturated structure is about 30 pounds per lineal inch of roll.

The total solution applied to the fibrous layer is about 1.9 times the fiber layer weight — following the nip rolls.

The composite structure is then dried in an air circulating oven at a temperature of 270° F. for a period of about 3 minutes. The hot air is directed downward on the exposed fiber surface with little or no air directed upward to the bottom surface of the release paper. The dried structure, upon removal from the release paper, is found to have a weight of about 0.21 pound per square yard, a resistance to the passage of air of 0.36 inches of water at 100 feet per minute of air-face velocity, 5 to 10 oz./inch width adhesion to stainless steel (180° peel), and a thickness of 0.003 inch to 0.004 inch. The barrier tape is about 70% fiber and 30% resin.

EXAMPLE 2

A blend of 3.5 parts by weight of Ray Fluff X-Q paper fiber and 1 part by weight of 1.75 dpf polyester staple fiber, both previously described, is formed into a continuous web by air-laying. This web is treated in the manner described in Example 1 with a solution of the following composition:

Acrylic latex - pressure-sensitive polymer (Ulrich - U.S. Pat. No. 2,844,126): 6000 gm
Water: 4000 gm
Tamol 731 — 25% 50 gm
Triton X-100 20 gm
Acrysol ASE-60 200 gm
Pthalocynanine green pigment dispersion (W-6014-Harshaw Chemical Company): 12 gm
Ammonium hydroxide — 28%: 90 gm
Water: 2700 gm The viscosity of the solution is about 55 centipoises. After drying, the self-adhering structure has an air flow resistance of 0.2 inch of water at 100 feet per minute airface velocity, 5 to 10 oz./inch width adhesion to steel (180° peel), has a thickness of about 0.003 inch to 0.004 inch, is composed of about 60% fiber and 40% resin, and has a weight of about 0.19 pound per square yard.

EXAMPLE 3

A blend of 3 parts by weight of Ray Floc X-J paper fiber, available from Rayonier Inc., and 1 part by weight of 1.75 dpf polyester staple fiber is formed into a continuous web and treated, with the solution of Example 2, in the manner previously described with the exception that the final addition of water is 2300 grams rather than 2700 grams and the resultant solution viscosity is 70 centipoises.

Following drying, the self-adherent structure has a flow resistance of 0.6 inch of water at 100 feet per minute of air-face velocity, 5 to 10 oz./inch width adhesion to steel (180° peel), has a weight of about 0.22 pound per square yard, and is composed of about 55% fiber and 45% resin.

EXAMPLE 4

A 50:50 blend of 1 part of 1.75 dpf polyester and 1 part cotton staple fiber of 5 micronaire value, and made into a web as before, was saturated with a solution of the following composition:

Acrylic latex pressure-sensitive polymer N-580 (Rohm & Haas Co.): 1360 gm
Water: 1640 gm
Tamol 731 — 25%: 10 gm
Acrysol ASE-60: 20 gm
Ammonium hydroxide (28%): 10 gm The viscosity of the solution is about 250 centipoises. After drying the structure had an air-flow resistance of 0.14 inch (100 FPM — face velocity) and about 2 – 5 oz./inch of width adhesion to steel (180° peel). It was about 60% fiber and 40% resin, and weighed 0.11 pound per square yard.

Tests of the barrier tapes for foam retention have shown that structure having air-flow resistance values to the passage of air at 100 ft/minute air face velocity of below about 0.10 inch of water were too porous and had almost no foam retention characteristics. Correspondingly, barrier tapes exhibiting air flow resistance values above about 0.7 inch of water resulted in foams of non-uniform density and poor insulating qualities.

Figure 2:
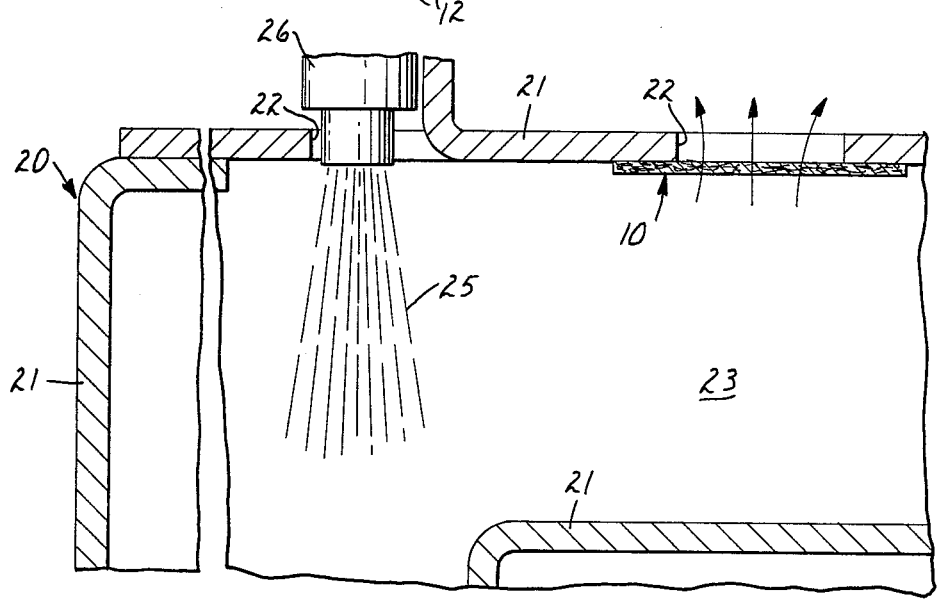
FIG. 2 is an enlarged fragmentary sectional view of a cabinet illustrating the introduction of the foam forming material with the barrier tape of FIG. 1 in place over a vent opening.
Figure 3:
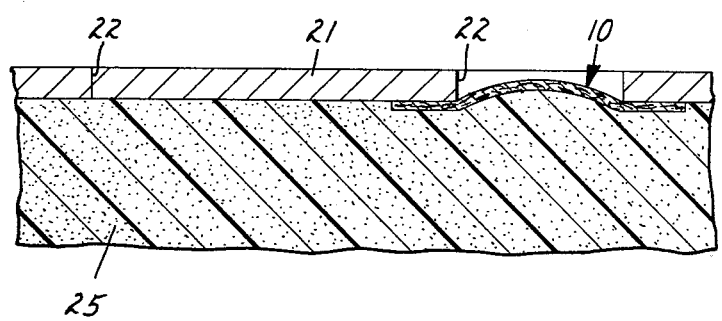
FIG. 3 is an enlarged fragmentary sectional view of a portion of FIG. 2 showing the cabinet with the barrier tape after foaming has been completed.

Barrier tapes 10 of the present invention have been used in the foam application process to cover vent openings 22 in the walls 21 of cabinet 20 ranging from one-eighth to three-fourths inch in diameter. Although the actual vent specifications relating to placement, diameter and number varies from manufacturer to manufacturer, the vents 22 are all located near the base of the completed cabinet. Thus, in the foaming process, the vents would be located near or at the top of the cabinet as shown in FIG. 2.

In the foam forming process, generally five to ten percent excess foam forming material 25 is charged to the cavity 23 through a supply nozzle 26 to insure total fill. The resulting charging pressure of about 2 to 4 psi on the cabinet walls 21 is sufficient to distort the cabinet 20 unless the side walls 21 are restrained as in a jig (not shown). Surprisingly, although the barrier tapes of the present invention prevents the passage of the partially fluid, chemically reacting urethane foam therethrough, the tape 10 is only slightly deformed in the foaming process, causing it to bulge slightly (approximately 1 mm.) and yet not protrude beyond the cabinet wall 21. The thus restrained cabinet is subjected to an oven treatment at about 150° to 170° F. for 5 to 10 minutes to finish off and cure the insulating foam 25.

All of the barrier tapes produced according to the teachings of the Examples prevented the exudation of urethane foam while allowing the escape of gases, thus giving a foam of uniform density within the cavity and with a smooth impervious skin at the exposed surface of the barrier tape to provide a moisture barrier. The barrier tapes over the vent openings not only eliminated the need to remove any bumps of foam and to seal the cut surface but also provided an attractive surface appearance.

What is claimed is:

1. A gas-permeable, foam-impermeable pressure-sensitive adhesive barrier tape consisting essentially of a thin, porous, nonwoven web formed from a mixture of hydrophobic staple length textile fibers and cellulosic paper length fibers unified with a pressure-sensitive adhesive resin composition which substantially coats the fibers to thereby bond them together at their crossing points while leaving the interstices of the web substantially unfilled, said barrier tape having air-flow resistance values to the passage of air at 100 ft./min., air face velocity of between about 0.10 to about 0.7 inch of water, and a porous, tacky, pressure-sensitive adhesive surface on one side thereof and a substantially non-tacky surface on the other.

2. A gas-permeable, foam-impermeable, pressure-sensitive adhesive barrier tape according to claim 1 wherein the web is a 1:5 blend of polyester staple fibers and bleached paper fibers.

3. A gas-permeable, foam-impermeable pressure-sensitive adhesive barrier tape according to claim 1 wherein the web is a 1:3 blend of polyester staple fibers and paper fibers.

4. A gas-permeable, foam-impermeable pressure-sensitive adhesive barrier tape according to claim 1 wherein the web is a 1:1 blend of polyester staple fibers and cellulosic staple fibers.

5. The method of insulating a cabinet having spaced inner and outer walls enclosing a space comprising providing at least one filler opening of adequate size and a plurality of vent openings, covering said vent openings with a gas-permeable, foam-impermeable pressure-sensitive adhesive barrier tape according to claim 1 and introducing through said filler opening a foam-forming polyurethane composition.

* * * * *